(12) United States Patent
Gill et al.

(10) Patent No.: US 6,947,241 B1
(45) Date of Patent: Sep. 20, 2005

(54) PRE-BLOCK ID MARK FOR MULTI-DIRECTIONAL BLOCK LOCATION WHEN USING A UNIDIRECTIONAL CODING FORMAT

(75) Inventors: Richard Allen Gill, Arvada, CO (US); Roger D. Hayes, Denver, CO (US); Keith Gary Boyer, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 378 days.

(21) Appl. No.: 10/213,945

(22) Filed: Aug. 7, 2002

(51) Int. Cl.[7] ............................................. G11B 19/02
(52) U.S. Cl. ................................................. 360/72.2
(58) Field of Search ................................... 360/72.2

(56) References Cited

U.S. PATENT DOCUMENTS 5,321,558 A * 6/1994 Tackett .................. 360/39
6,118,605 A * 9/2000 Call et al. .................. 360/50
6,665,137 B2 * 12/2003 Zweighaft et al. ......... 360/72.1

\* cited by examiner

*Primary Examiner*—David Hudspeth
*Assistant Examiner*—Mitchell Slavitt
(74) *Attorney, Agent, or Firm*—Yee & Associates, P.C.

(57) ABSTRACT

An asynchronous method for locating individual blocks of data in a tape drive, without having to read the blocks of data is provided. The invention comprises placing an ID mark adjacent to the data blocks and inter-block gaps on the tape. The ID mark contains a small amount of information about the next respective data block on the tape. The ID mark is encoded such that the same detection mechanism that detects the inter-block gap can also retrieve the ID mark information, without having to process the entire block of data associated with a particular ID mark. The ID mark is symmetrical such that it can be detected and decoded in the forward and backward direction, allowing the tape drive to find a desired block of data by searching either forward or backward, even when the magnetic tape uses a unidirectional data format.

25 Claims, 7 Drawing Sheets

Backward search: Not Possible

PRE-BLOCK ID MARK FOR MULTI-DIRECTIONAL BLOCK LOCATION WHEN USING A UNIDIRECTIONAL CODING FORMAT

BACKGROUND OF THE INVENTION

1. Field of the Invention

The present invention relates generally to magnetic tape drives, and more specifically to a method for locating individual blocks of data on magnetic tapes.

2. Background of the Invention

Magnetic tape is a sequential storage medium used for data collection, backup, and historical purposes. Magnetic tape is made of flexible plastic with one side coated with a ferromagnetic material. Magnetic tapes come in reels and cartridges of many sizes and shapes. In older systems, open reels are used while most presently available systems employ cartridges to hold the magnetic tape.

For information storage and retrieval, magnetic tape has proven especially reliable, cost efficient and easy to use. In an effort to make magnetic tape even more useful and cost effective, attempts have been made to store more information per given width and length of tape. This increase in storage has generally been accomplished by including more data tracks on a given width of tape. While allowing more data to be stored, this increase in the number of data tracks results in those tracks being more densely packed onto the tape.

When using a high efficiency modulation coding technique for writing data to tape, the codes tend to be unidirectional in nature. In a tape drive environment, the restriction of reading in only one direction can cause severe performance degradation when searching for individual blocks of data or searching for the next write position.

Therefore, it would be beneficial to have an asynchronous method to locate individual blocks of data, without having to read the unidirectional blocks of data.

SUMMARY OF THE INVENTION

The present invention provides an asynchronous method for locating individual blocks of data in a tape drive, without having to read the blocks of data. The invention comprises placing an ID mark adjacent to the data blocks and inter-block gaps on the tape. The ID mark contains a small amount of information about the next respective data block on the tape. The ID mark is encoded such that the same detection mechanism that detects the inter-block gap can also retrieve the ID mark information, without having to process the entire block of data associated with a particular ID mark. The ID mark is symmetrical such that it can be detected and decoded in the forward and backward direction, allowing the tape drive to find a desired block of data by searching either forward or backward, even when the magnetic tape uses a unidirectional data format.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
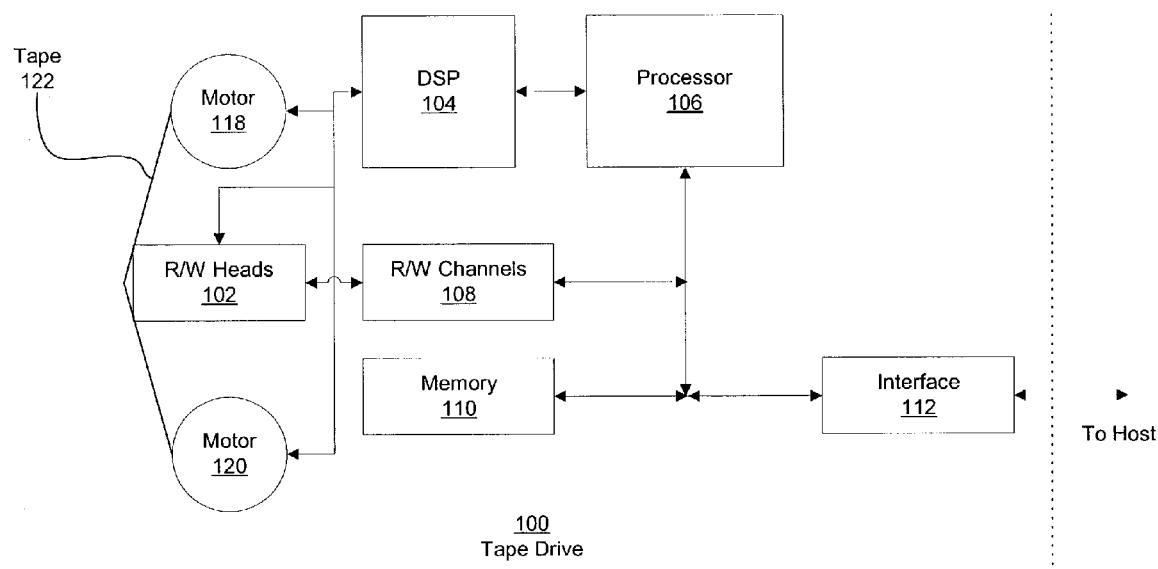
FIG. 1 depicts a block diagram of a tape drive in accordance with the present invention.

With reference now to FIG. 1, a block diagram of a tape drive in accordance with the present invention is depicted. Tape drive 100 is an example of a tape drive system in which the mechanism of the present invention for creating and reading data may be implemented. The mechanism allows for information, such as a format identification block to be written on a magnetic tape in a manner that allows this data to be read by tape drives implementing different recording formats and track widths.

As illustrated, tape drive 100 includes processor 106, digital signal processor (DSP) 104, read/write (R/W) heads 102, read/write (R/W) channels 108, memory 110, interface 112, and motors 118–120. Processor 106 executes instructions stored within memory 110 that control the functions of the other components within tape drive 100 such that read and write functions may be executed. Instructions for writing and reading data, such as a format identification block, may be stored in memory 110. Memory 110 is a nonvolatile memory, such as a nonvolatile random access memory.

Processor 106 may be implemented in various ways depending on the particular embodiment. For example, processor 106 may be a microprocessor or may even take the form of an advanced RISC microprocessor (ARM). Specifically, processor 106 executes instructions used to write and read data in a manner that other tape drives may read this data even if those tape drives are designed to read data on tracks having a different track width than tape drive 100.

Interface 112 provides an interface to allow tape drive 100 to communicate with a host computer or with a host network. Motors 118–120, controlled by digital signal processor (DSP) 104, move tape 122 such that read/write heads 102 can read information from or write information to tape 122. Tape 122 is a magnetic tape in these examples.

During write operations, read-write channels 108 provides for the reliable conversion of digital data into analog signals that drive the elements of read/write head 102. Read/write head 102 creates magnetic patterns on tape 122 as it is moved past. The conversion process includes the generation and appending of error correcting data to the digital data stream that is used during readback to help ensure that data errors are detected and corrected.

During readback, R/W channels 108 processes the analog head signals created by read/write head 102 as tape 122 is moved past. The channels extract the data, detect and correct errors, and provide a digital data stream to processor 106, memory 110, and interface 112.

Figure 2:
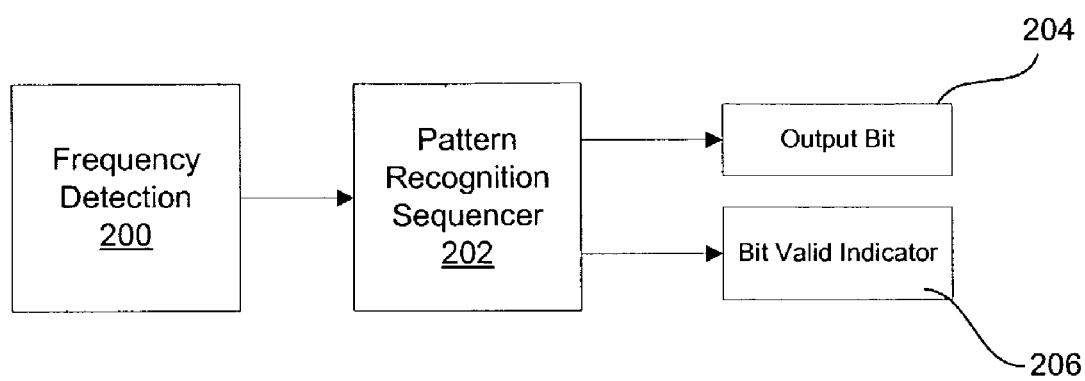
FIG. 2 depicts a diagram illustrating components used to read and write data in accordance with a preferred embodiment of the present invention.

With reference now to FIG. 2, a diagram illustrating components used to read and write data is depicted in accordance with a preferred embodiment of the present invention. In this example, frequency detection 200 and pattern recognition sequencer 202 are employed to read and write data to a magnetic tape, such as tape 122 in FIG. 1. Frequency detection 200 is part of a read channel within read/write channels 108 in FIG. 1. Pattern recognition sequencer 202 is a software component executed by a processor, such as processor 106 in FIG. 1.

Figure 3:
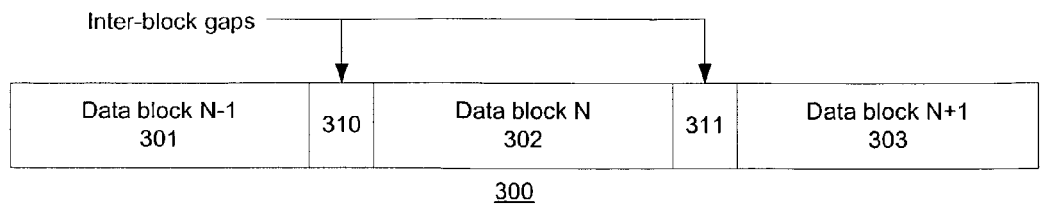
FIG. 3 depicts a diagram illustrating a search method for data blocks in a unidirectional tape drive in accordance with the prior art.
Figure 3:
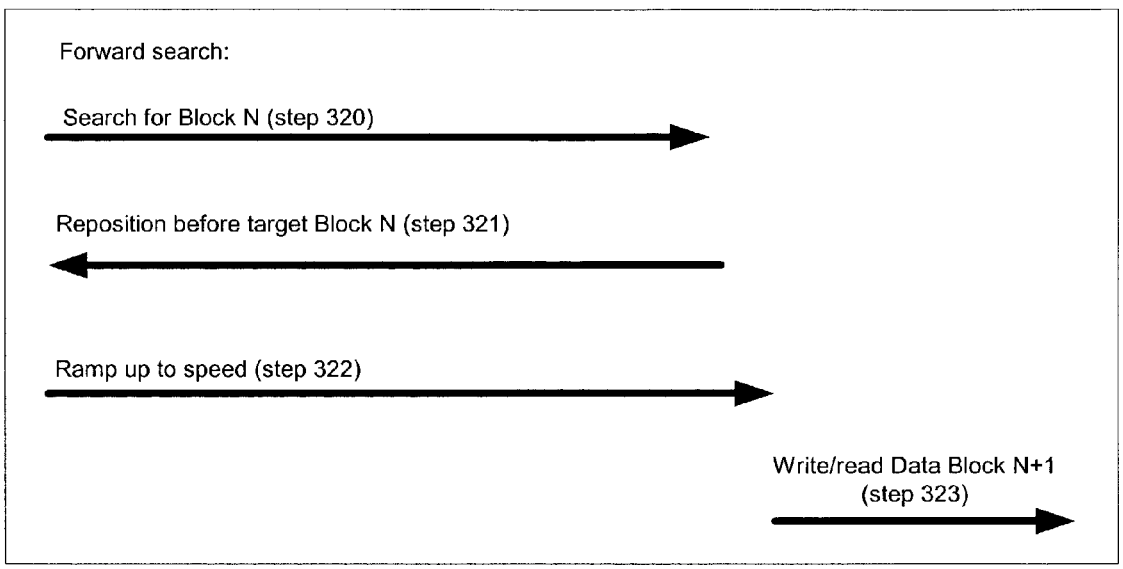

Referring now to FIG. 3 a diagram illustrating a search method for data blocks in a unidirectional tape drive is depicted in accordance with the prior art. The magnetic tape 300 in FIG. 3 is divided into different types of sections, each with its own purpose. Data is written to and read from defined data blocks 301, 302, and 303. Between the data blocks 301–303, are inter-block gaps (IBGs) 310 and 311.

The IBGs 310 and 311 define the beginning and end of the data blocks 301–303 and facilitate the distribution of data along the tape 300 in discrete segments. Distributing data across multiple discrete segments allows the tape drive to locate specific data.

When using a high efficiency modulation coding technique for writing data to tape, the codes tend to be unidirectional in nature. Unfortunately, this unidirectional restriction reduces the performance of the tape drive by making it more cumbersome to locate individual blocks of data on the tape.

FIG. 3 illustrates the prior art steps needed for forward direction search for a data block in a unidirectional tape drive. The tape drive must first search forward along the tape 300 for a particular data bock, e.g., data block N 302 (step 320). After data block N 302 is located, the tape drive must rewind the tape to reposition in front of data block N 302 (step 321), then ramp up to speed (step 322) before writing or reading data block N+1 303 (step 323).

Reading block N 302 guarantees that the writing to block N+1 303 follows the previous block N 302. If the drive were to blindly append to a block without knowing its ID, an out-of-sequence error could occur on a later read through this area. Therefore, block N 302 is found to make sure that the drive is positioned correctly to begin streaming successive blocks in order, and ensure that block N+1 303 is not skipped due to block detection errors. The repositioning (step 321) and ramping up to speed (step 322) also protect against positioning error caused by tape slippage.

In addition to the cumbersome task of locating data blocks in the forward direction, unidirectional tape drives also have the disadvantage of not being able to search in the backward direction, which further limits performance.

Without the present invention, block N needs to be read entirely for validation. By the time the validation is complete, it is too late to begin writing to block N+1 and maintain the specified IBG distance. This is because the space between the recording head writers and readers is greater that the IBG distance. Ideally, validation needs to be complete before the end of block N by a distance of reader-to-writer space, minus IBG distance. As described below, the present invention provides a pre-block ID, which supplies block N validation in time to append block N+1. The present invention allows the drive to perform a high-speed search and locate the correct position, before slowing down so that block N+1 can be read.

Figure 4:
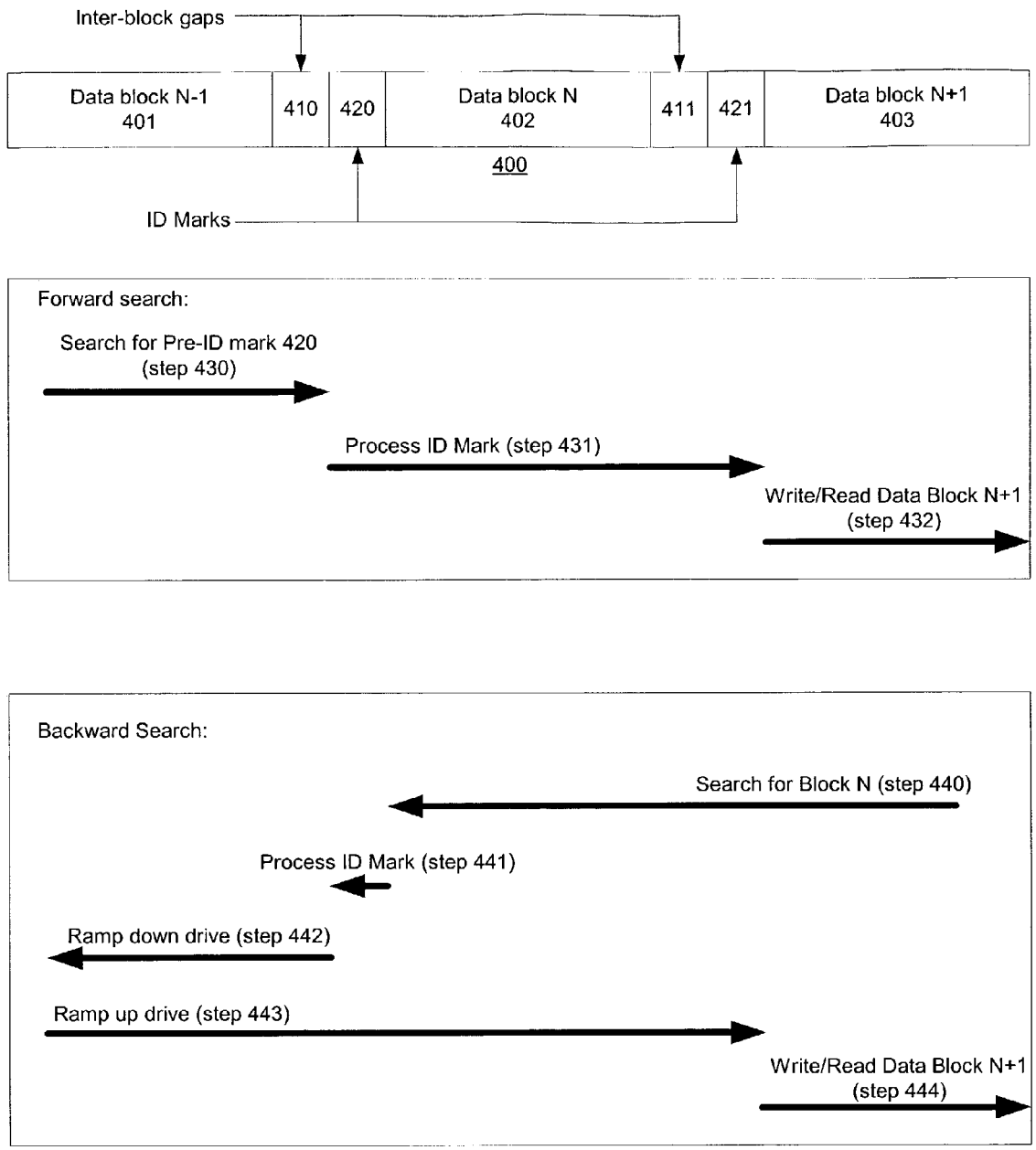
FIG. 4 depicts a diagram illustrating a search method for data block in a unidirectional tape drive using ID marks in accordance with the present invention.

Referring to FIG. 4, a diagram illustrating a search method for data block in a unidirectional tape drive using ID marks is depicted in accordance with the present invention. The present invention provides an asynchronous method for locating individual blocks of data, without having to read the unidirectional blocks of data. The invention comprises placing pre-block ID marks 420 and 421 adjacent to the respective IBGs 410 and 411 and data blocks 402 and 403. The ID marks 420 and 421 each contain a small amount of information about the next respective data block on the tape 400. The ID marks 420 and 421 are encoded such that the same detection mechanism that detects the inter-block gaps 410 and 411 can also retrieve the ID mark information and validate the data block without having to process the entire data block, as was the case with the prior art.

The ID marks 420 and 421 are symmetrical such that they can be detected and decoded in the forward and backward direction, allowing the tape drive to find a desired block of data by searching either forward or backward, unlike the prior art. This capability increases performance since the tape drive does not have to stop, reposition the tape, and then search forward in order to locate data blocks on the tape 400.

FIG. 4 illustrates how data blocks on the tape 400 may be located in either the forward or backward direction. In forward searching, the tape drive first locates pre-ID mark 420 (step 430). Unlike, the prior art, the present invention does not need to actually read data block N 402 in order to locate it. Instead, the tape drive can rely on the pre-block ID mark 420 to identify data block N 402.

Once ID mark 420 is located, it is processed, allowing the tape drive to skip ahead to the next inter-block gap 411 and ID mark 421 (step 431). The tape drive can then read or write to data block N+1 403 (step 432). Again, as explained above, block N 402 must be located before reading or writing block N+1 403 to ensure proper block-to-block sequencing. The search operation is separate from the read operation. Therefore, once block N 402 has been validated via ID mark 420, the search switches over to a read (or write) operation for block N+1 403. The ID mark can be processed fast enough to allow the drive to switch over from search to read/write on the fly, without the need to stop and re-ramp the drive, as in the prior art.

To locate data blocks in the backward direction, the tape drive first searches for ID mark 420 in the backward direct (step 440) and processes it (step 441). As stated above, the ID marks 420 and 421 can be detected and decoded forward and backward, saving the trouble of having to rewind and then search forward for the ID mark.

After data block N 402 is located and its ID mark 420 is processed, the tape drive will ramp down the drive (step 442) and then ramp the drive up to speed (step 443). Though the ID mark 420 can be read in the backward direction during the search operation, data on block N+1 403 can only be read or written in the forward direction because the tape drive is unidirectional. Therefore, the drive has to re-position and ramp up for the next read/write. The tape drive can then read or write to data block N+1 403 (step 444).

Figure 5:
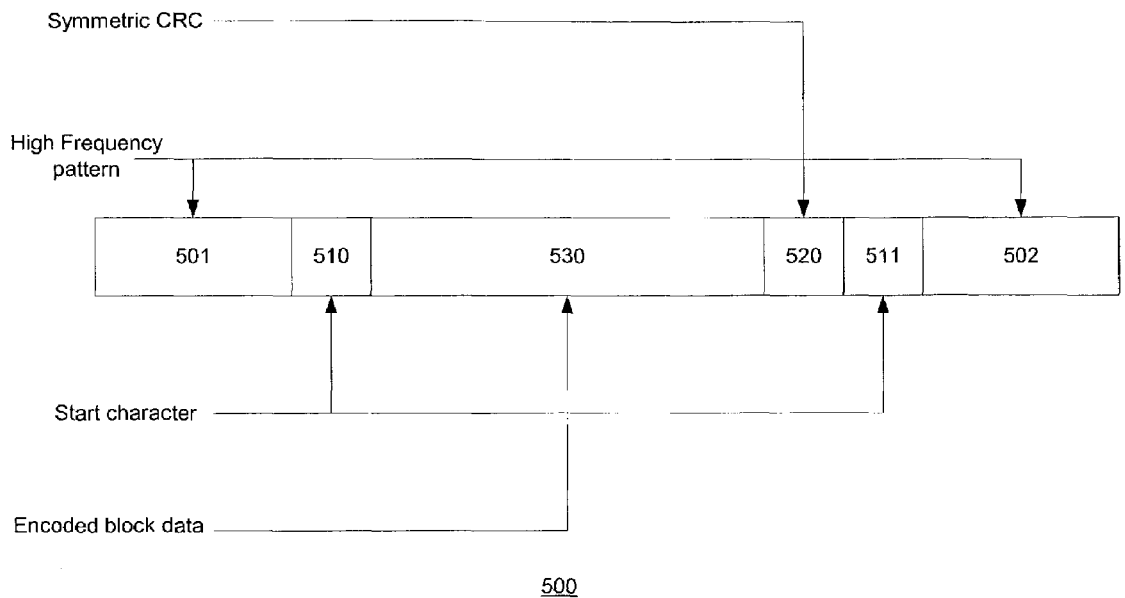
FIG. 5 depicts a diagram illustrating the format for ID marks in accordance with the present invention.

Referring to FIG. 5, a diagram illustrating the format for ID marks is depicted in accordance with the present invention. The encoded ID data 530 is flanked by two start characters 510 and 511. At the end of the encoded data block 530 is a cyclic redundancy check (CRC) 520. On the outside of the start characters 510 and 511 are the high frequency patterns 501 and 502. These are also referred to as preambles and signal the drive to search for the start characters (510 or 511, depending on the direction of tape movement).

The ID data 530 is encoded in a format in which a 6-bit encode is used for each information bit written (1-bit to 6-bit translation). The 6-bit entity is called a 6-tuple.

The Partial Response, Maximal Likelihood (PRML) recording technique is used to record the ID mark 500. PRML is used to differentiate valid signals from noise by measuring the rate of change at various intervals of the rising waveform. Bits have uniform characteristics, whereas random noise does not. PRML uses digital signal processing (DSP) to reconstruct the data. The ID data 530 is detectible using simple synchronous or asynchronous peak detection methods and is robust enough to allow changes in tape velocity.

Figure 6:
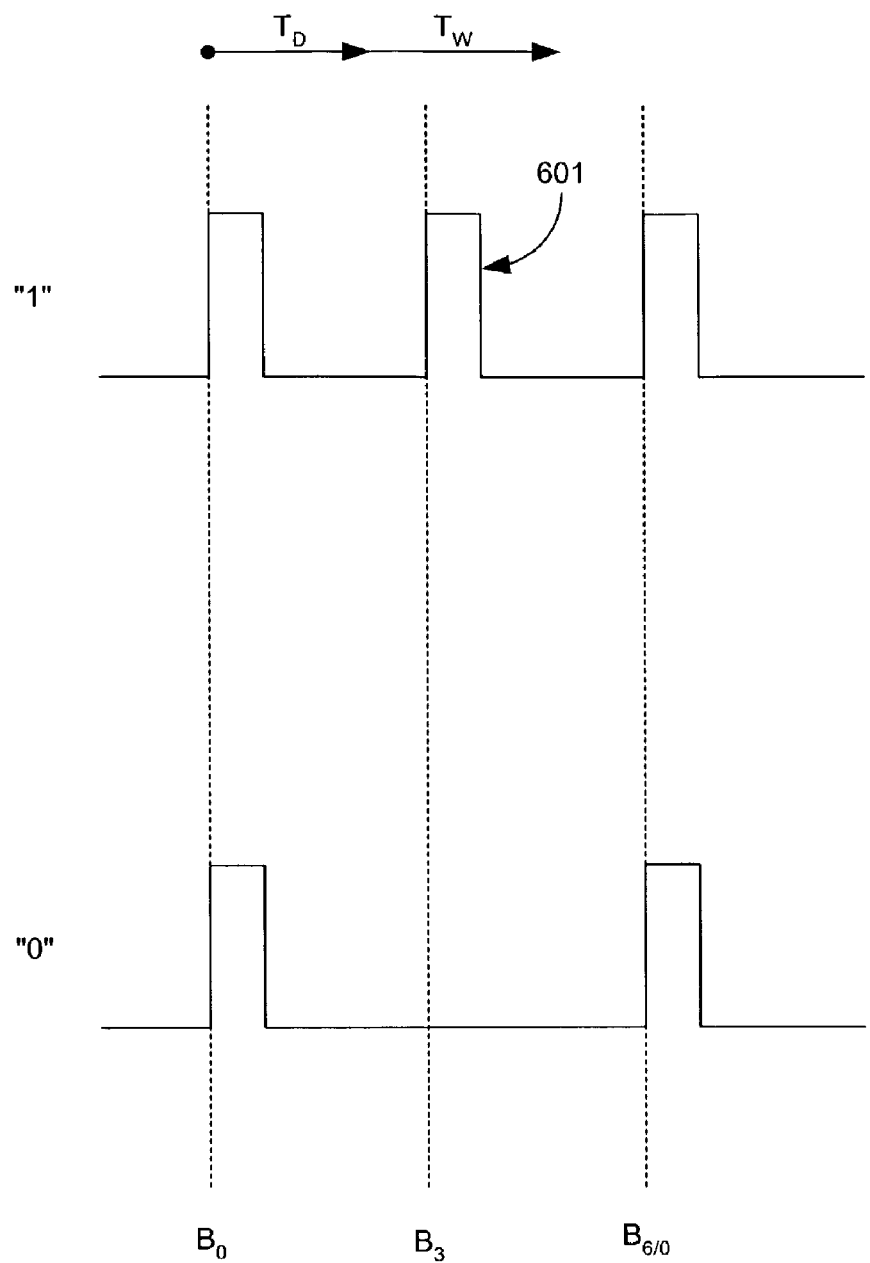
FIG. 6 depicts a diagram illustrating a method for detecting 6-tuple ID data in accordance with the present invention.

Referring to FIG. 6, a diagram illustrating a method for detecting 6-tuple ID data is depicted in accordance with the present invention. Detection of the 6-tuple data is accomplished by detecting peaks in the waveform. FIG. 6 illustrates the timing for a "1" bit, and the absence of the 1 bit, which produces a "0". $T_D$ is a delay to the detection window $T_w$. If a waveform peak 601 is detected in the window, a "1" is received, if no peak is detected, a "0" is received.

Peak detection is accomplished by taking a 2.5× over sample of the analog waveform, and then running the data through a finite impulse response (FIR) filter. An amplitude threshold is used to detect the leading entry into the pulse. When digitized amplitude values exceed, e.g., the positive threshold, a bit is detected. The next impulse is detected when the signal falls through the negative threshold. Since there is only one threshold, the baseline of the signal is about zero volts.

When the signals baseline wanders, the timing relationship between detected positive and negative going pulses is compromised. When the baseline voltage increases, the positive pulses are detected earlier. In like fashion, the negative pulses are detected later. When the baseline is lowered, the reverse delays are seen.

Figure 7:
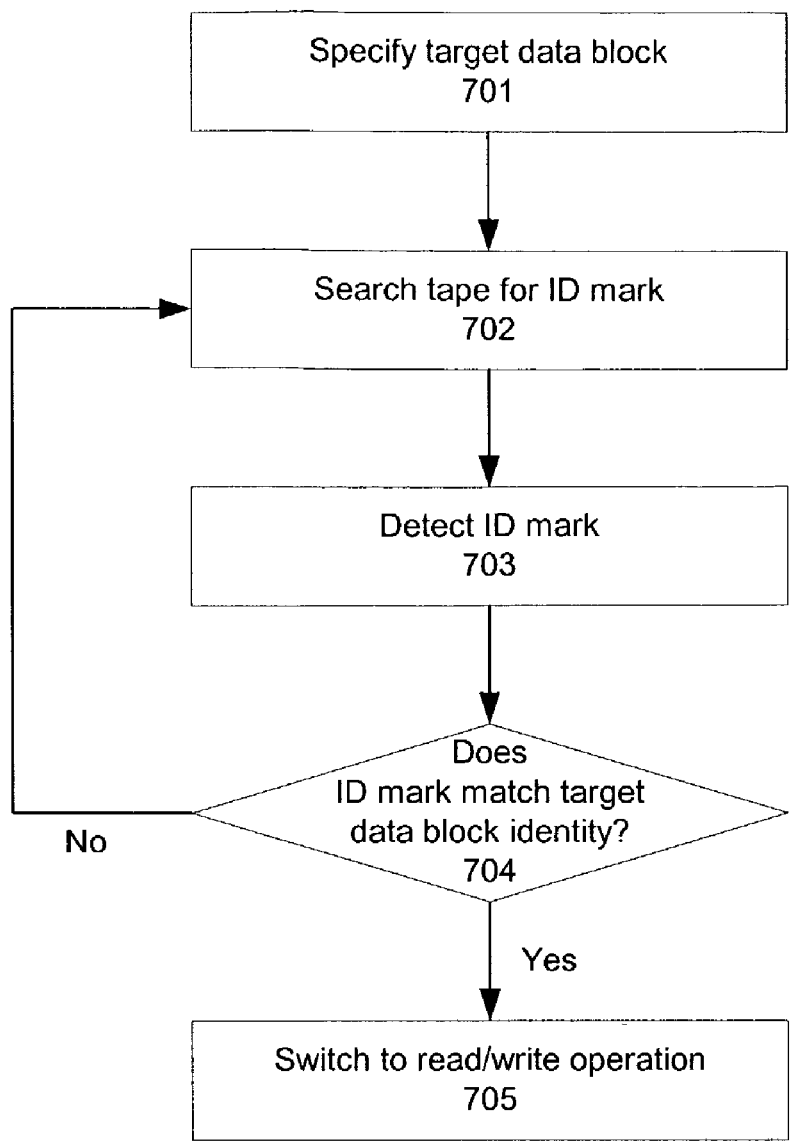
FIG. 7, a flowchart illustrating the process of identifying a data block is depicted in accordance with the present invention.

Referring now to FIG. 7, a flowchart illustrating the process of identifying a data block is depicted in accordance with the present invention. When the target data block in question is specified (step 701), the tape drive searches along the tape for the corresponding Id mark (step 702). As the drive moves along the tape, it detects ID marks associated with each data block on the tape (step 703). As each ID mark is detected, the tape drive must determine if the ID mark matches the target data block (step 704). If the ID mark does not match the target data block, the drive continues to search. If the ID mark in question does match the target data block, the tape drive switches over to a read/write operation (step 705). As explained above, the ID marks can be processed quickly enough for the tape drive to switch to the read/write operation before reaching the next data block while searching in the forward direction. If the search is in the backward direction, the tape naturally has time to switch over to read/write as it ramps down and then ramps up in the forward direction.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for locating data on a magnetic tape in a tape drive, the method comprising the steps of:

searching the tape for a specified data block, wherein tape is organized into a plurality of data blocks and inter-block gaps; and detecting and decoding an identification mark associated with said specified data block, wherein the tape drive can identify the specified data block by reading the identification mark, and wherein the identification mark precedes the data block and is adjacent to the inter-block gap.

2. The method according to claim 1, wherein the identification in ark can be read by the tape drive in both forward and backward directions.

3. The method according to claim 1, wherein the magnetic tape has a unidirectional data format.

4. The method according to claim 1, wherein the identification mark comprises data encoded in a 6-tuple format.

5. The method according to claim 1, wherein the identification mark is detected by means of waveform peak.

6. A method for locating data on a magnetic tape in a tape drive, the method comprising the steps of:

searching the tape for a specified data block, wherein tape is organized into a plurality of data blocks and inter-block gaps; and detecting and decoding an identification mark associated with the specified data block, wherein the tape drive can identify the specified data block by reading the identification mark and without reading the specified data block, and wherein the identification mark can be read by the tape drive in both forward and backward directions.

7. The method according to claim 6, wherein the magnetic tape has a unidirectional data format.

8. A method for locating data on a magnetic tape in a tape drive, the method comprising the steps of:

organizing the tape into data block and inter-block gaps; and placing identification marks at the front of each data block, adjacent to the inter-block gaps, wherein the tape drive can identify each data block by reading the preceding identification mark.

9. The method according to claim 8, wherein the identification mark can be read by the tape drive in both forward and backward directions.

10. The method according to claim 8, wherein the magnetic tape has a unidirectional data format.

11. The method according to claim 8, wherein the identification mark comprises data encoded in a 6-tuple format.

12. A system for locating data on a magnetic tape in a tape drive, the system comprising:

a means for searching the tape for a specified data block, wherein tape is organized into a plurality of data blocks and inter-block gaps; and a means for detecting and decoding an identification mark associated with said specified data block, wherein the tape drive can identify the specified data block by reading the identification mark, and wherein the identification mark precedes the data block and is adjacent to the inter-block gap.

13. The system according to claim 12, wherein the identification mark can be read by the tape drive in both forward and backward directions.

14. The system according to claim 12, wherein the magnetic tape has a unidirectional data format.

15. The system according to claim 12, wherein the identification mark comprises data encoded in a 6-tuple format.

16. The system according to claim 12, wherein the identification mark is detected by means of waveform peak.

17. A system for locating data on a magnetic tape in a tape drive, the system comprising:
- a means for searching the tape for a specified data block, wherein tape is organized into a plurality of data blocks and inter-block gaps; and
- a means for detecting and decoding an identification mark associated with the specified data block, wherein the tape drive can identify the specified data block by reading the identification mark and without reading the specified data block, and wherein the identification mark can be read by the tape drive in both forward and backward directions.

18. The system according claim 17, wherein the magnetic tape has a unidirectional tape format.

19. A computer program product in a computer readable medium for use in a data processing system, for locating data on a magnetic tape in a tape drive, the computer program product comprising:
- first instructions for searching the tape for a specified data block, wherein tape is organized into a plurality of data blocks and inter-block gaps; and
- second instructions for detecting and decoding an identification mark associated with said specified data block, wherein the tape drive can identify the specified data block by reading the identification mark, and wherein the identification mark precedes the data block and is adjacent to the inter-block gap.

20. The computer program product according to claim 19, wherein the identification mark can be read by the tape drive in both forward and backward directions.

21. The computer program product according to claim 19, wherein the magnetic tape has a unidirectional data format.

22. The computer program product according to claim 19, wherein the identification mark comprises data encoded in a 6-tuple format.

23. The computer program product according to claim 19, wherein the identification mark is detected by means of waveform peak.

24. A computer program product in a computer readable medium for use in a data processing system, for locating data on a magnetic tape in a tape drive, the computer program product comprising:
- first instructions for searching the tape for a specified data block, wherein tape is organized into a plurality of data blocks and inter-block gaps; and
- second instructions for detecting and decoding an identification mark associated with the specified data block, wherein the tape drive can identify the specified data block by reading the identification mark and without reading the specified data block, and wherein the identification mark can be read by the tape drive in both forward and backward directions.

25. The computer program product according to claim 24, wherein the magnetic tape has a unidirectional data format.

* * * * *